(12) United States Patent
Bell et al.

(10) Patent No.: US 9,428,239 B1
(45) Date of Patent: Aug. 30, 2016

(54) BICYCLE CONVERTIBLE TO A STROLLER

(71) Applicant: Pi Manufacturing Inc., Guelph (CA)

(72) Inventors: Robert Bell, Guelph (CA); Kaleb Michener, Guelph (CA)

(73) Assignee: Pi MANUFACTURING INC., Guelph (CA)

( * ) Notice: Subject to any disclaimer, the term of this patent is extended or adjusted under 35 U.S.C. 154(b) by 0 days.

(21) Appl. No.: 14/744,636

(22) Filed: Jun. 19, 2015

(51) Int. Cl.
*B62K 13/00* (2006.01)
*B62K 13/08* (2006.01)
*B62B 7/12* (2006.01)

(52) U.S. Cl.
CPC *B62K 13/08* (2013.01); *B62B 7/12* (2013.01)

(58) Field of Classification Search
CPC ......... B62B 7/12; B62B 7/126; B62K 13/00; B62K 13/08
See application file for complete search history.

(56) References Cited

U.S. PATENT DOCUMENTS

| | | | | |
|---|---|---|---|---|
| 1,427,417 A | * | 8/1922 | Rickey | B62K 5/02 280/202 |
| 1,661,257 A | * | 3/1928 | Kirch | B62K 5/05 280/202 |
| 2,482,585 A | * | 9/1949 | Hauptman | B62K 13/00 280/202 |
| 4,770,431 A | * | 9/1988 | Kulik | A61G 5/003 280/202 |
| 4,789,175 A | * | 12/1988 | Schramm | A61G 5/003 280/282 |
| 4,863,183 A | * | 9/1989 | Hwang | B62K 5/05 180/210 |
| 5,324,060 A | * | 6/1994 | Van Vooren | A61G 5/023 280/304.1 |
| 5,398,955 A | * | 3/1995 | Yeh | B62K 15/006 280/278 |
| 5,836,602 A | * | 11/1998 | Wang | B62K 15/008 280/278 |
| 6,336,649 B1 | * | 1/2002 | Lin | B62H 1/02 224/418 |
| 6,341,791 B1 | * | 1/2002 | Cannon, Sr. | A61G 5/003 280/204 |
| 6,688,627 B1 | * | 2/2004 | Strange | A47C 13/00 280/278 |
| 7,780,184 B2 | * | 8/2010 | Ehrenreich | B62B 7/12 280/202 |
| 7,992,889 B2 | * | 8/2011 | Ehrenreich | B62B 7/12 280/202 |
| 9,150,271 B1 | * | 10/2015 | Liu | B62K 27/10 |
| 2003/0230609 A1 | * | 12/2003 | Chu | A45C 13/262 224/423 |
| 2005/0043147 A1 | * | 2/2005 | Huang | B62K 13/00 482/57 |
| 2006/0261575 A1 | * | 11/2006 | Ehrenreich | B62B 7/04 280/643 |
| 2010/0096827 A1 | * | 4/2010 | Tsai | B62K 13/00 280/261 |
| 2014/0367931 A1 | * | 12/2014 | Bell | B62K 13/00 280/7.17 |
| 2015/0203166 A1 | * | 7/2015 | Kitchen | B62K 13/00 280/7.1 |
| 2016/0016629 A1 | * | 1/2016 | Wang | B62K 15/00 180/208 |

* cited by examiner

*Primary Examiner* — Jeffrey J Restifo
*Assistant Examiner* — Erez Gurari
(74) *Attorney, Agent, or Firm* — Walker & Jocke

(57) ABSTRACT

A bicycle convertible from a bicycle mode to a stroller mode comprises a frame having a front portion supporting a carrier and a rear portion. A front wheel supports the front portion of the frame, and a rear wheel supporting the rear portion of the frame in the bicycle mode. The rear portion of the frame is hinged to the front portion of the frame such that to convert the bicycle from the bicycle mode to the stroller mode the rear portion of the frame can be moved alongside the front portion of the frame to position the rear wheel to support a one side of the rear portion of the carrier. An auxiliary wheel, movable between a raised position raised from a riding surface in the bicycle mode can be moved to a lowered position contacting the riding surface in the stroller mode to supports the other side of the carrier.

20 Claims, 16 Drawing Sheets

BICYCLE CONVERTIBLE TO A STROLLER

FIELD OF THE INVENTION

This invention relates to bicycles. In particular, this invention relates to a bicycle that can be converted to a stroller.

BACKGROUND OF THE INVENTION

Cycling is popular as a leisure and exercise activity, and as a means of travelling short and medium distances. A typical bicycle, as is well known, comprises a frame supporting a seat for the rider, mounted on front and rear wheels one of which (typically the rear wheel) is driven by a pair of pedals disposed generally within reach of the rider from the seat. The front wheel is rotatably mounted within the frame and a steering mechanism, typically a handlebar, is rotationally fixed to the front wheel, allowing the rider to turn, and to maintain balance while riding.

Because it has only two wheels a bicycle is vertically stable in the direction of travel, i.e. along a line between the two-point contact of the wheels to the ground, but unstable in a lateral direction perpendicular to the direction of travel. The rider maintains balance when in motion by constantly steering toward the centre of gravity, to compensate for the lateral instability of the bicycle. In essence, when riding a bicycle the rider is always falling toward one side or the other, but stays upright by steering the bicycle toward the direction that the rider is falling at any particular moment. With a skilled rider this corrective process is imperceptible, but without this constant correction the bicycle would invariably fall over to one side. By itself the bicycle is incapable of maintaining lateral balance because it has only two-point contact with the ground.

Accordingly, a bicycle is not a feasible means of carrying children or goods unless a cyclist is actually riding it. If a cyclist is using a bicycle as a means of travelling with a child to a destination where the bicycle cannot be used, for example to a supermarket to shop for groceries, once at the destination the bicycle becomes an impediment. It has to either be locked and left unattended, which risks theft and leaves the user without a means of carrying the goods or child, or 'walked' about the destination, which is awkward at best and not even an option in places such as many commercial premises where bicycles are not allowed.

It would therefore be advantageous to provide a bicycle that is capable of being converted between a bicycle mode and a stroller mode. The user can walk with children and/or goods in the stroller mode, for example out of an apartment down to the street, convert the stroller to a bicycle and cycle to the destination with children and/or goods in the carrier, and then at the destination covert the bicycle back to the stroller mode and enter the supermarket to shop for groceries with the bicycle in the stroller mode. The bicycle need never be left unattended, and in both the bicycle mode and the stroller mode provides a convenient way to carry goods and/or children, while allowing the bicycle to be used as an environmentally friendly and efficient means of travelling to and from the destination.

BRIEF DESCRIPTION OF THE DRAWINGS

In drawings which illustrate embodiments of the invention solely by way of non-limiting example.

DETAILED DESCRIPTION OF THE INVENTION

Figure 1:
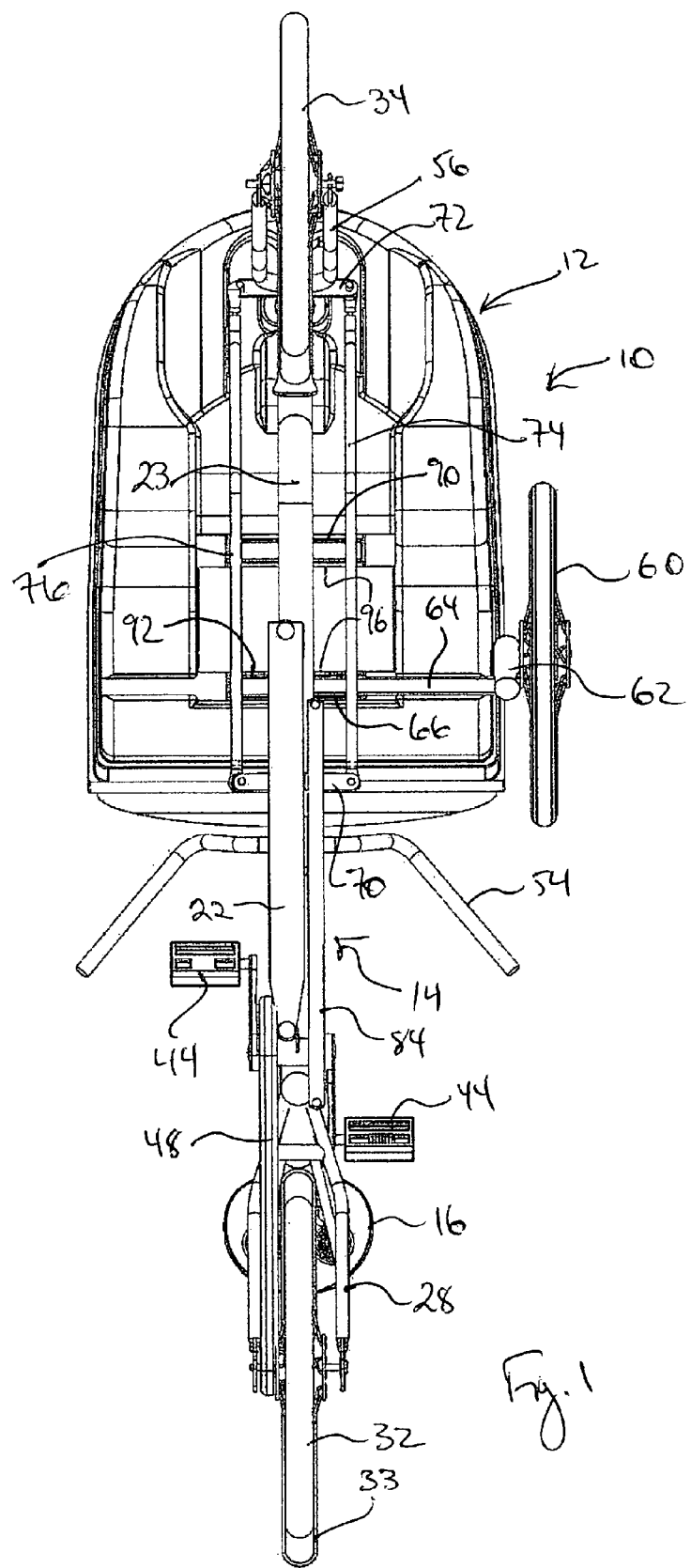
FIG. 1 is a bottom plan view of the bicycle in the bicycle mode.

The drawings illustrate an embodiment of a bicycle converted to a stroller according to the invention. The embodiment illustrated is particularly well adapted for use as a stroller for children, however it will be appreciated that the carrier can be adapted to and/or used to carry anything within the practical size and weight limits and the safety constraints of a bicycle. As used herein "stroller" includes a jogger, carrier, wheelchair, evacuation chair, cart or any other three-wheeled vehicle having a carrier capable of carrying humans, pets or other cargo.

A convertible bicycle 10 according to the invention comprises a carrier portion 12 mounted on a bicycle portion 14. In the example illustrated the bicycle comprises a frame 14 comprising a hinge member 22 and a seat tube 24 supported at a rear end of the hinge member 22. Rear wheel supports, conventionally comprising a seat stay 28 and chain stay 30, are affixed to the seat tube 24 at intermediate and lower positions, respectively, generally forming (in side view) a triangular frame section supported on both sides by the rear wheel 32, which may optionally be covered by a fender 33. These components along with a drive mechanism 40 form a rear portion 14*a* of the frame 14. Typically a saddle 16 is mounted to the seat tube 24 via a seat post 18.

In the embodiment shown the drive mechanism 40 comprises a conventional foot pedal assembly comprising crank arms 42 terminating in foot pedals 44, rotationally fixed to a drive sprocket 40 which drives a chain disposed about the rear wheel sprocket (not shown behind chain guard 48), to propel the bicycle 10 in a forward direction. The rear wheel sprocket may drive the rear wheel 32 in a conventional 'ratchet' fashion, rotationally engaging the rear wheel 32 in the forward direction but disengaging from the rear wheel 32 in the reverse direction. Thus, as the pedal assembly is rotated the rear wheel sprocket and rear wheel 32 rotate according to the gear ratio between the drive sprocket 40 and the rear sprocket, but if the cyclist stops rotating the pedal assembly the rear wheel 32 continues to rotate so as not to act against the momentum or impede the motion of the bicycle 10. The structures and principles involved in propelling a bicycle in this fashion are well known to those skilled in the art.

Many bicycles have multiple 'gears', for example providing a plurality of drive and/or rear wheel sprockets which can be selectively engaged by the cyclist in motion to increase or decrease the gear ratio between the drive and rear wheel sprockets, and thus the amount of force required to drive the rear wheel 32, as is well known. The invention is equally well suited for these and other types of 'multiple speed' bicycles.

A front portion 14b of the frame 14, constructed as a separate component from the rear portion 14a of the frame, comprises a front bottom tube 23 supporting a handlebar tube 26 that is oriented generally vertically (although advantageously having at a slight rearward angle as shown). The handlebar tube 26 contains a steering column 50 that is free to rotate within the handlebar tube 26. A handlebar stem 52 is affixed to the upper end of the steering column 50 in rotationally fixed relation, and in turn supports the steering member, for example handlebar 54, in rotationally fixed relation. The front bottom tube 23 curves or bends upwardly toward the front of the frame 14 and is supported by the upper end of a fork 56 which is in turn supported by the front wheel 34 in conventional fashion. A fender is optionally disposed above the front wheel 34 in order to protect the bottom of the carrier 12 from spray, small rocks and debris that may be kicked up by the front wheel 34 when the bicycle 10 is in motion.

The components of the frame 20 may be formed from any material suitable for a bicycle, and affixed in any suitable fashion (for example in the case of metal components, welded).

Figure 9:
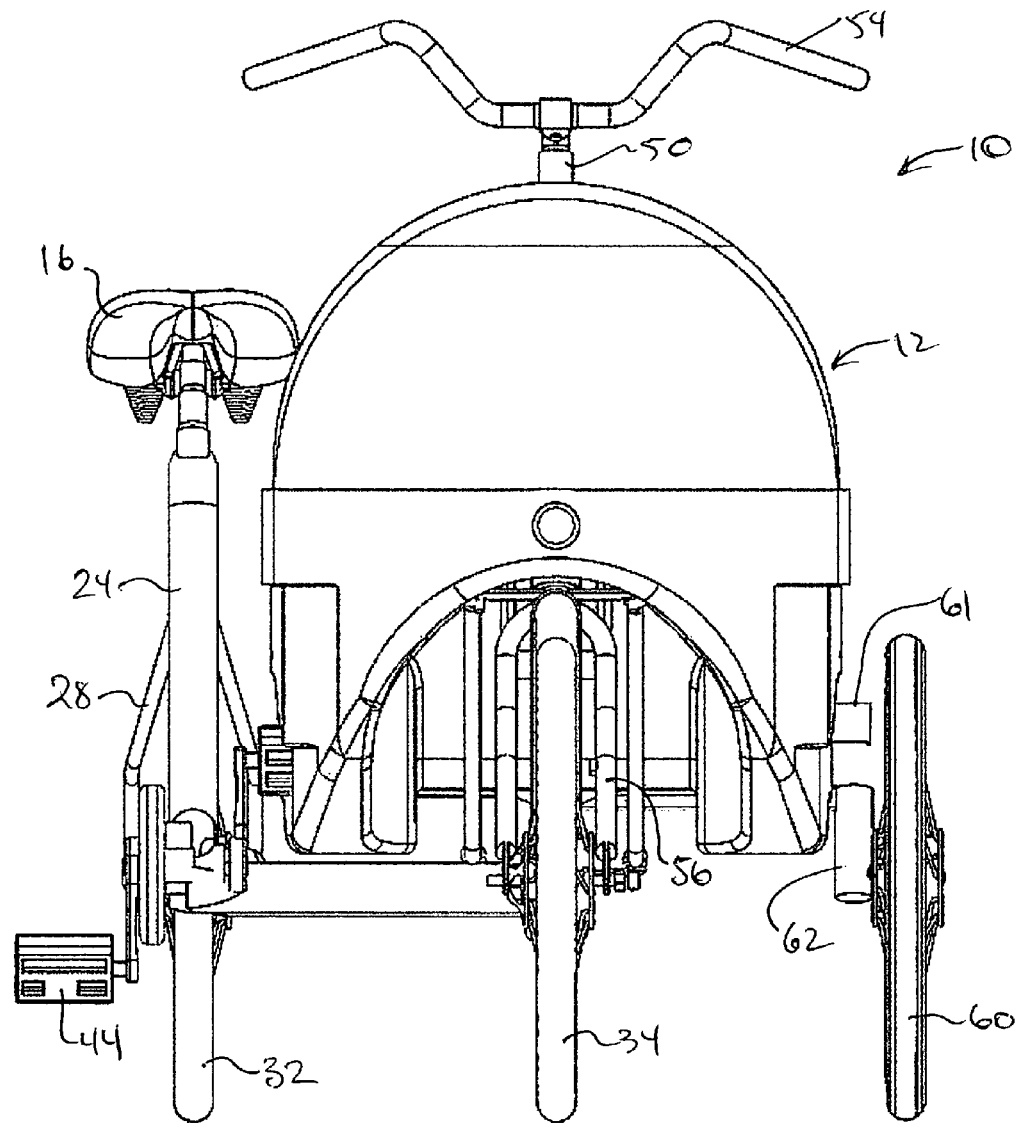
FIG. 9 is a front elevation of the bicycle in the stroller mode.
Figure 10:
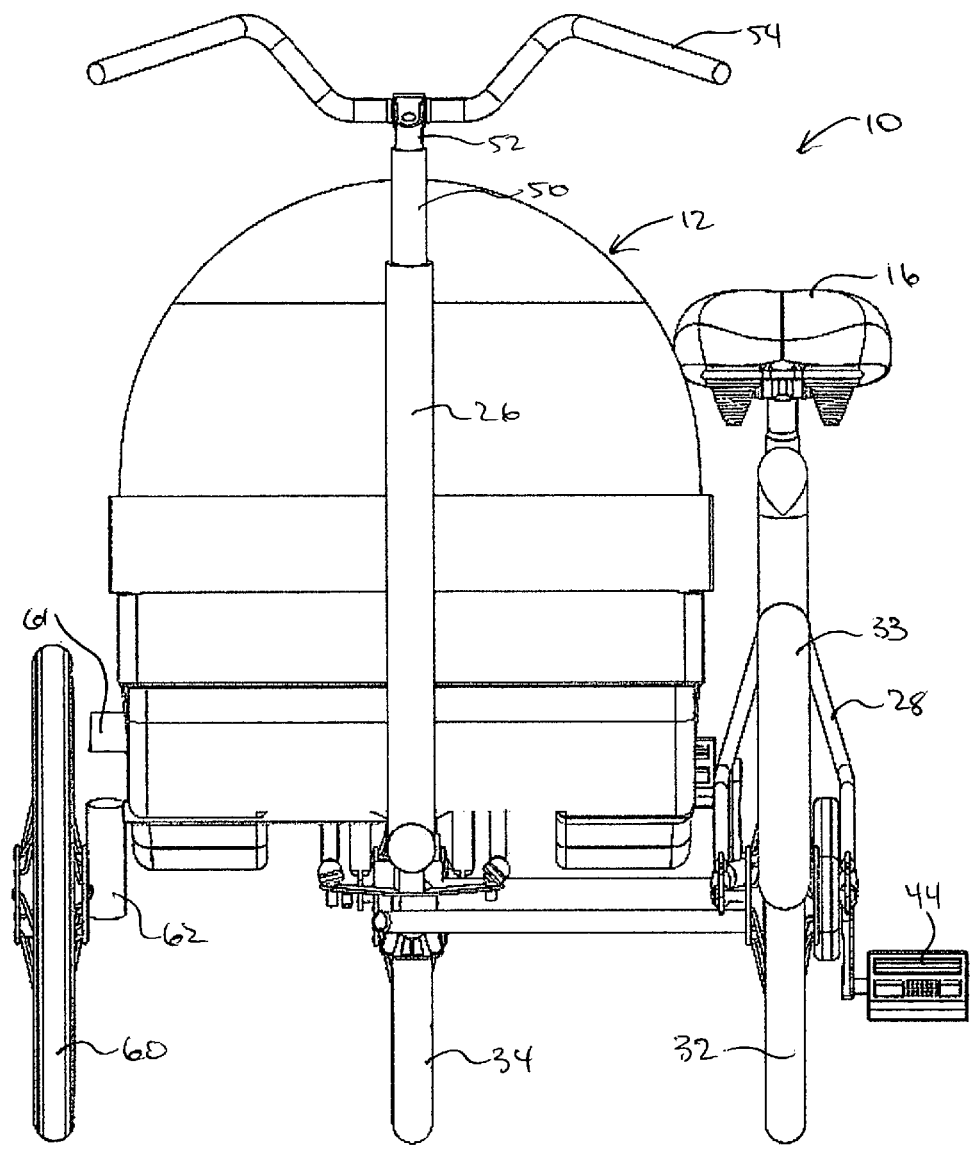
FIG. 10 is a rear elevation of the bicycle in the stroller mode.
Figure 13:
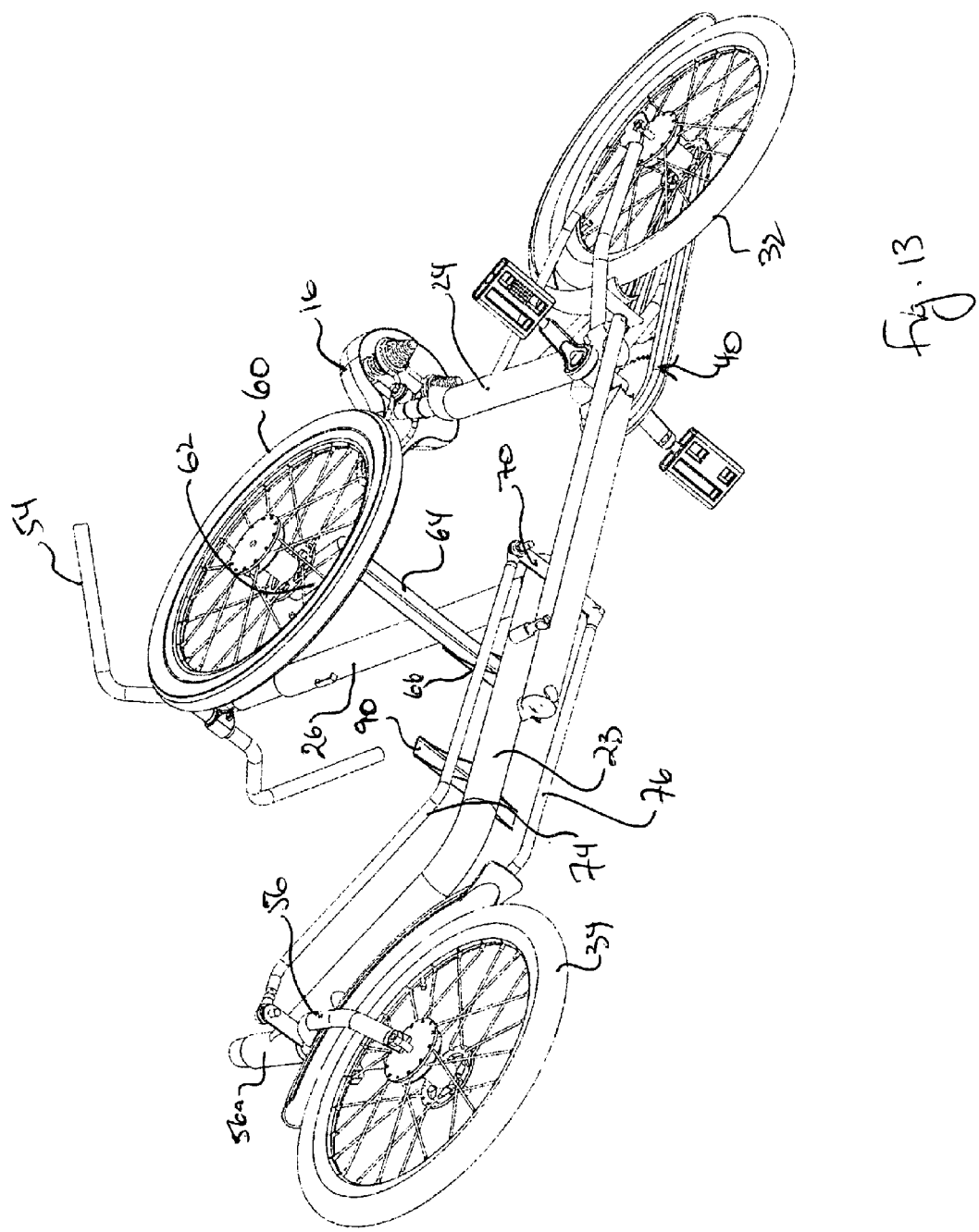
FIG. 13 is a bottom perspective view of the bicycle in the bicycle mode with the carrier removed for purposes of illustration.

The front fork 56 is rotationally affixed to the forward end of the front bottom tube 23, for example through a head tube equipped with ball bearings extending into a receptacle formed in the carrier (seen in FIG. 15), and is thus able to pivot to the left and right in order to steer the bicycle 10. The lower end of the steering column 50 is rotationally fixed to a rear steering linkage 70, seen in FIG. 2, such that rotating the handlebar 54 turns the steering column 50 which in turn rotates the rear steering linkage 70. A front steering linkage 72 is rotationally fixed to the fork 56. The rear and front steering linkages 70, 72 are connected by tie rods 74, 76 which also curve or bend upwardly toward the front of the frame 14 and are each respectively pivotally connected to an end of the steering linkages 70, 72. Thus, turning the handlebar 54 to rotate the rear steering linkage 70 rotates the front steering linkage 72 via tie rods 74, 76, in turn rotating the fork 56 and thereby rotating front wheel 34 to steer the bicycle 10 in both the bicycle mode and the stroller mode. In order to maximize the length of the carrier 12, described below, the carrier 12 is provided with a recessed front end (best seen in FIGS. 3 and 9) to accommodate the upwardly-directed front ends of the front bottom tube 23 and tie rods 74, 76 and a portion of the front wheel 34 (shown in FIG. 13 with the carrier 12 removed for purposes of illustration).

Figure 2:
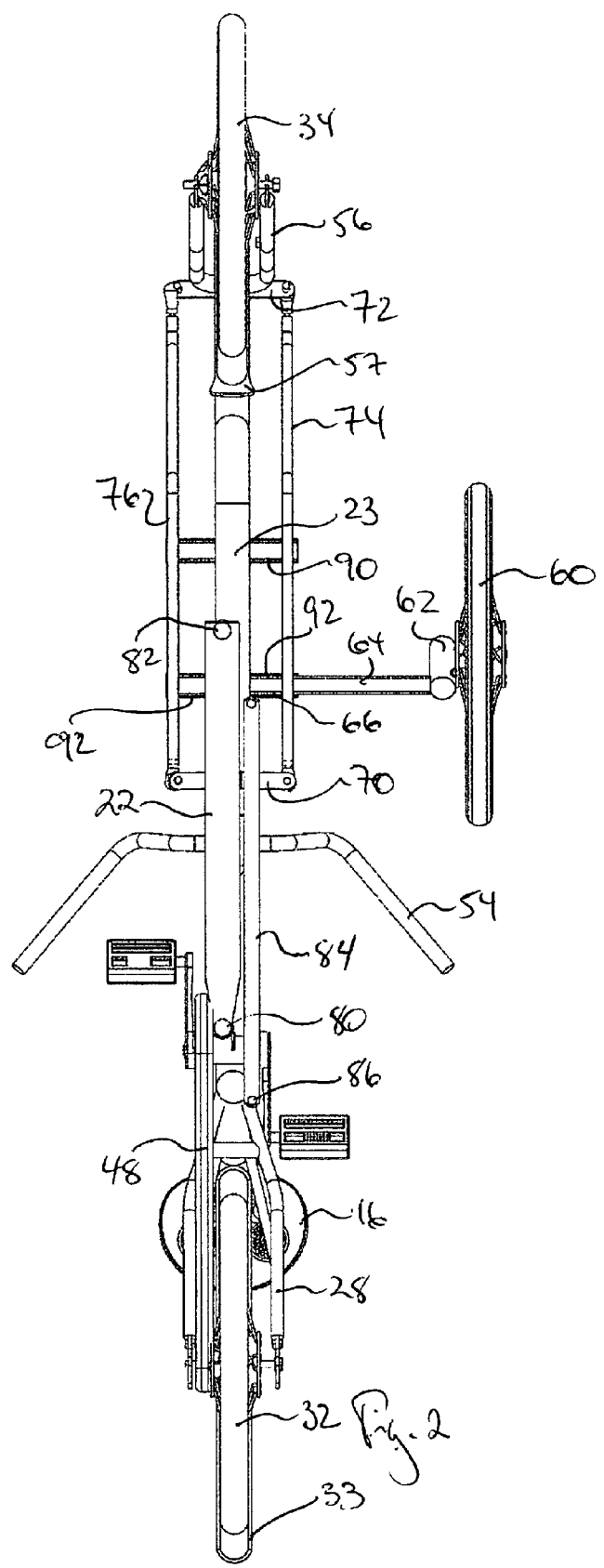
FIG. 2 is a bottom plan view of the bicycle in the bicycle mode with the carrier removed for purposes of illustration.
Figure 3:
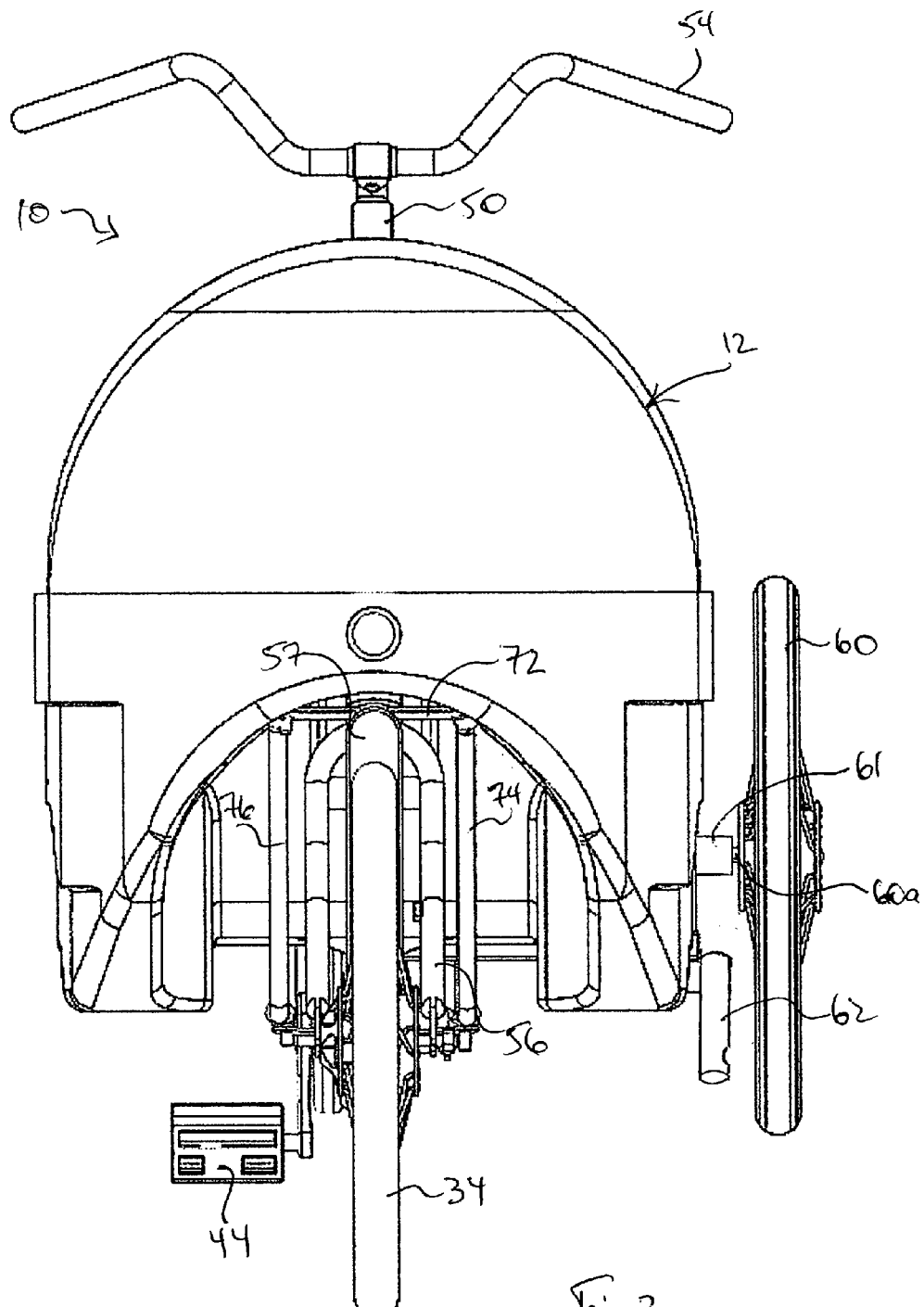
FIG. 3 is a front elevation of the bicycle in the bicycle mode.
Figure 4:
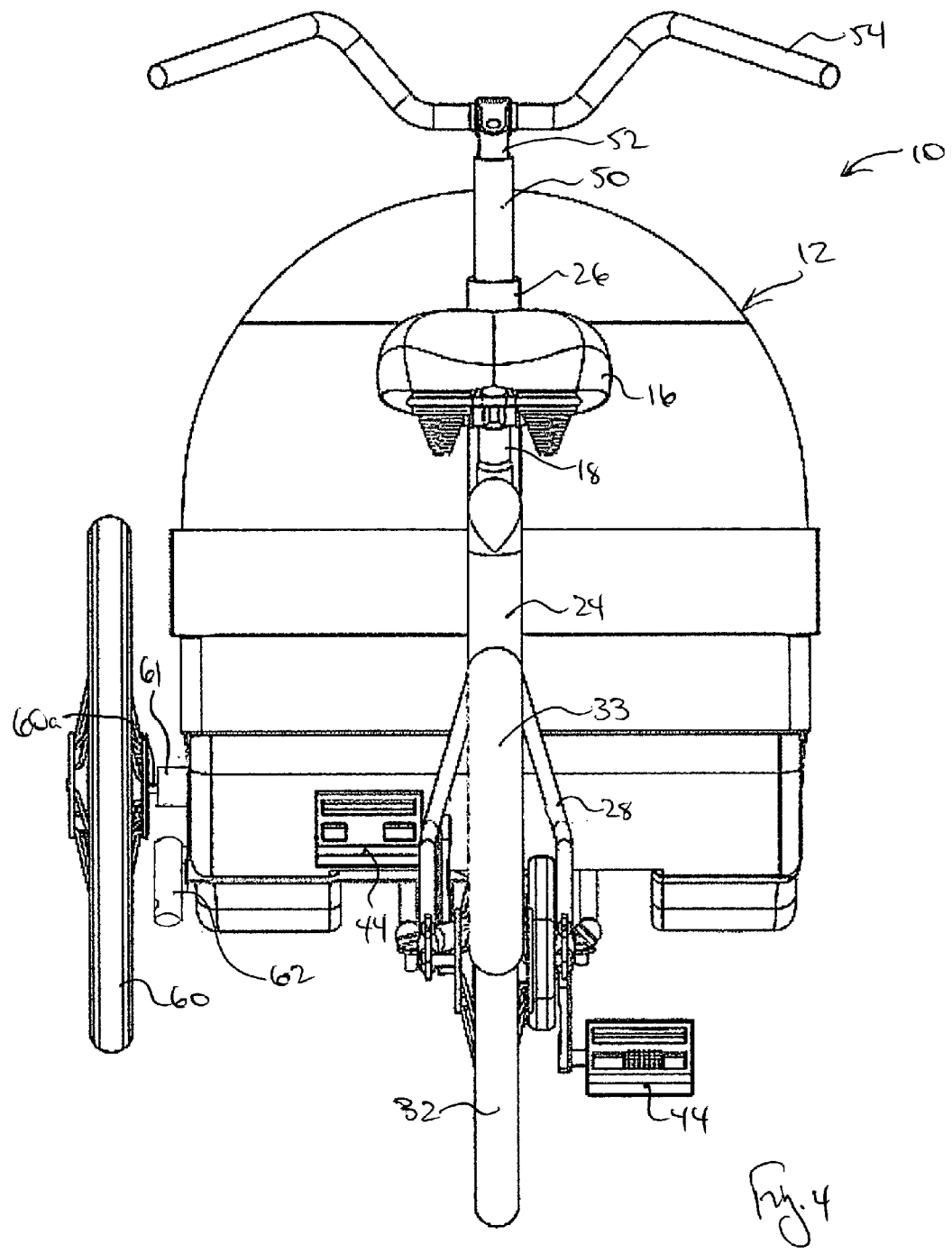
FIG. 4 is a rear elevation of the bicycle in the bicycle mode.
Figure 5:
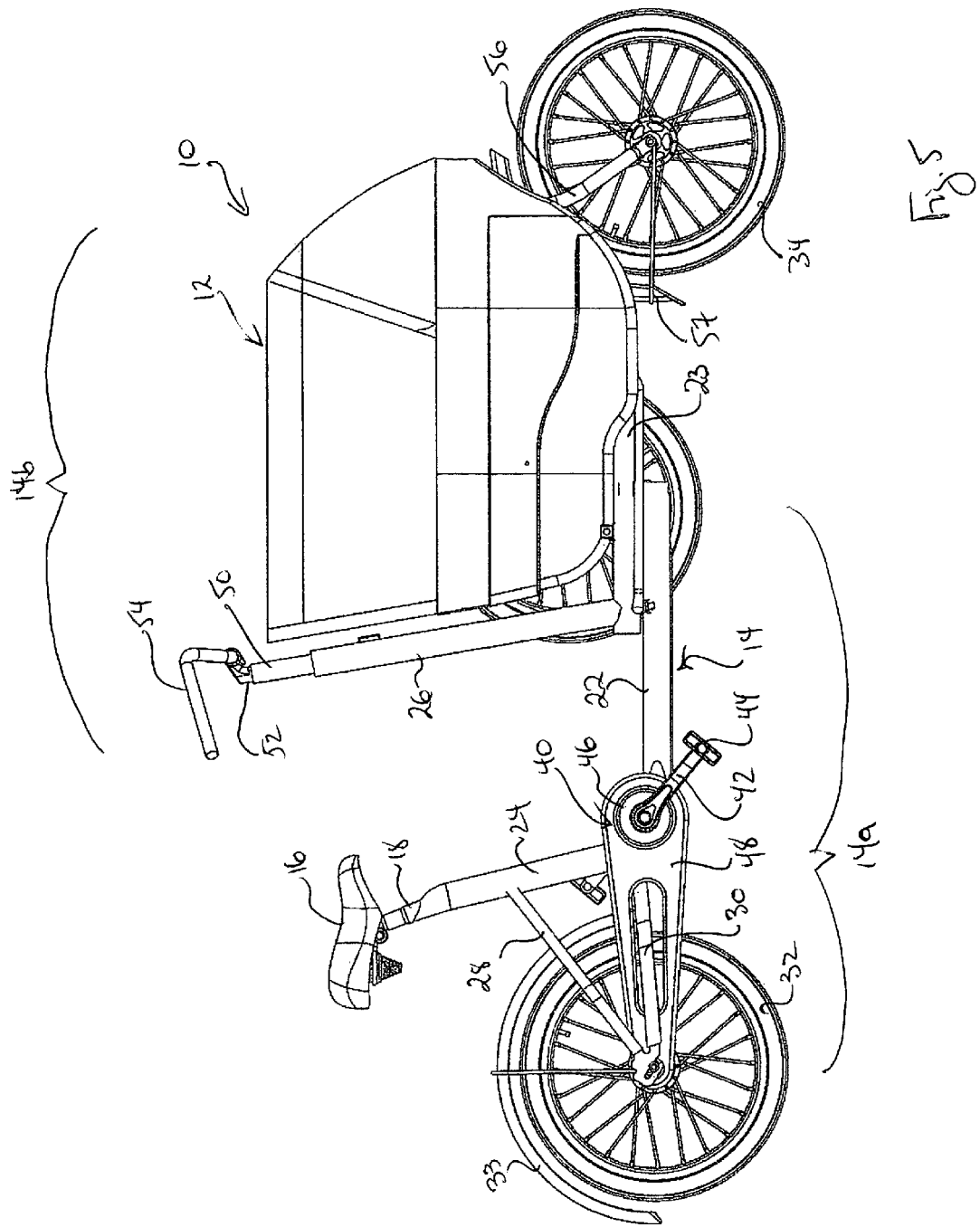
FIG. 5 is a right side elevation of the bicycle in the bicycle mode.
Figure 6:
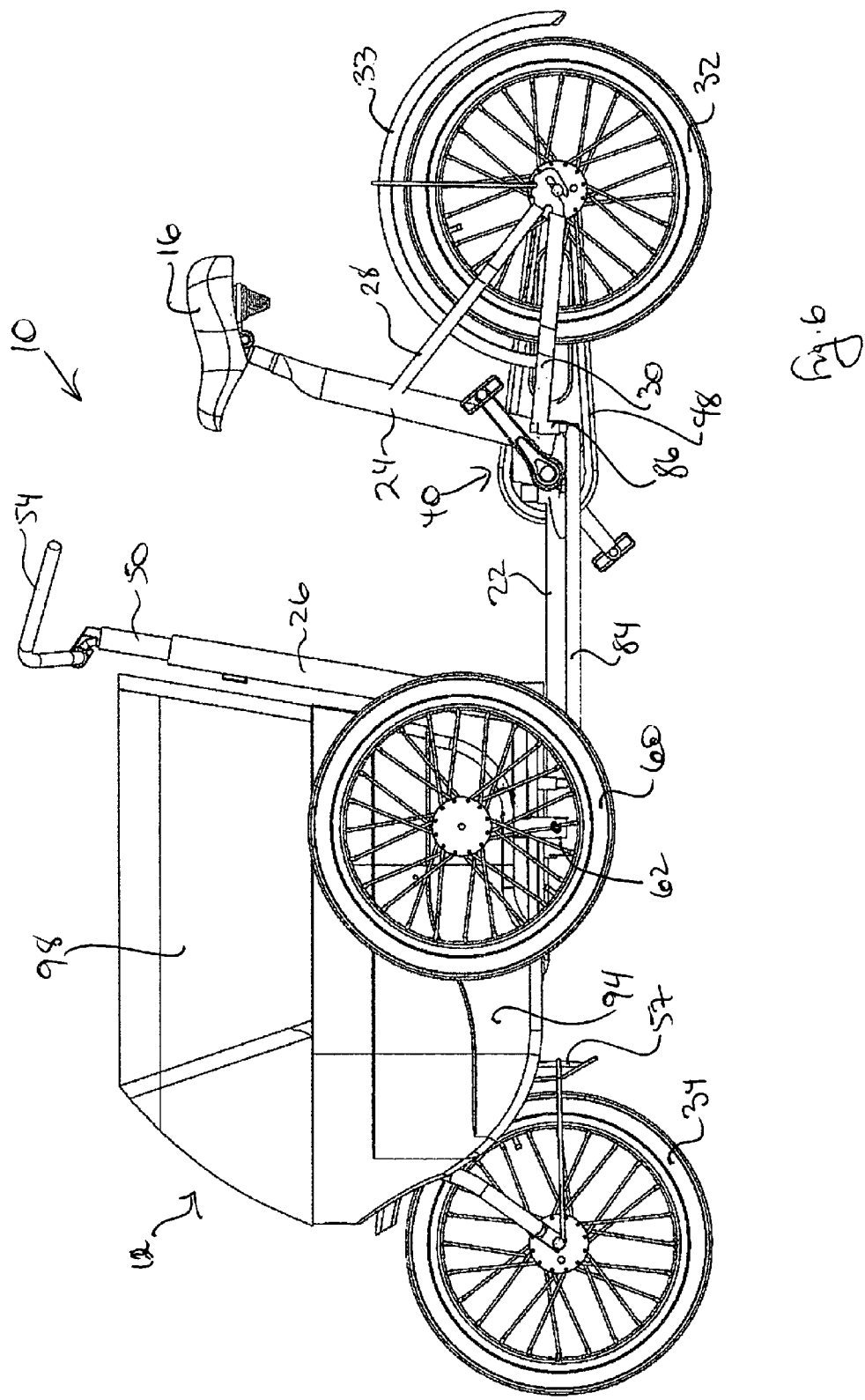
FIG. 6 is a left elevation of the bicycle in the bicycle mode.

The rear end of the hinge member 22 is pivotally connected to rear portion 14a of the frame 14, as at pivot 80, and the front end of the hinge member 22 is pivotally connected to the front portion 14b of the frame 14, for example to an intermediate position of the front bottom tube 23 as at pivot 82 (see FIG. 2). The hinge member 22 thus allows the rear portion 14a of the frame 14 to fold toward the front portion 14b of the frame 14 in the manner described below.

For ease of conversion, in the embodiment shown a link arm 84 connects the rear 14a and front 14b portions of the frame, parallel to the hinge member 22. The rear end of the link arm 84 is pivotally connected to rear portion 14a of the frame 14, for example to the chain stay 30 as at pivot 86, and the front end of the link arm 84 is pivotally connected to the front portion 14b of the frame 14, to an intermediate position of the front bottom tube 23 as at pivot 88. The pivots thus 80, 86 form a hinge point allowing the hinge member 22 to fold forwardly toward the front portion 14b of the frame 14, pivots 82, 88 forming hinge points allowing the rear portion 14a of the frame 14 to fold against the carrier 12 such that the rear wheel 32 is positioned to support the rear of the carrier 12 at one side, retaining the orientation of the rear portion 14a throughout the conversion. Thus, in the embodiment illustrated the link arm 84 is provided to create a pivoting parallelogram that generally maintains the rear portion 14a of the frame 14 (and in particular the rear wheel 32) in parallel alignment with the front portion 14b of the frame 14; however, it will be appreciated that this is merely a convenience and a bicycle 10 of the invention can function to convert to the stroller mode without the link arm 84.

Figure 7:
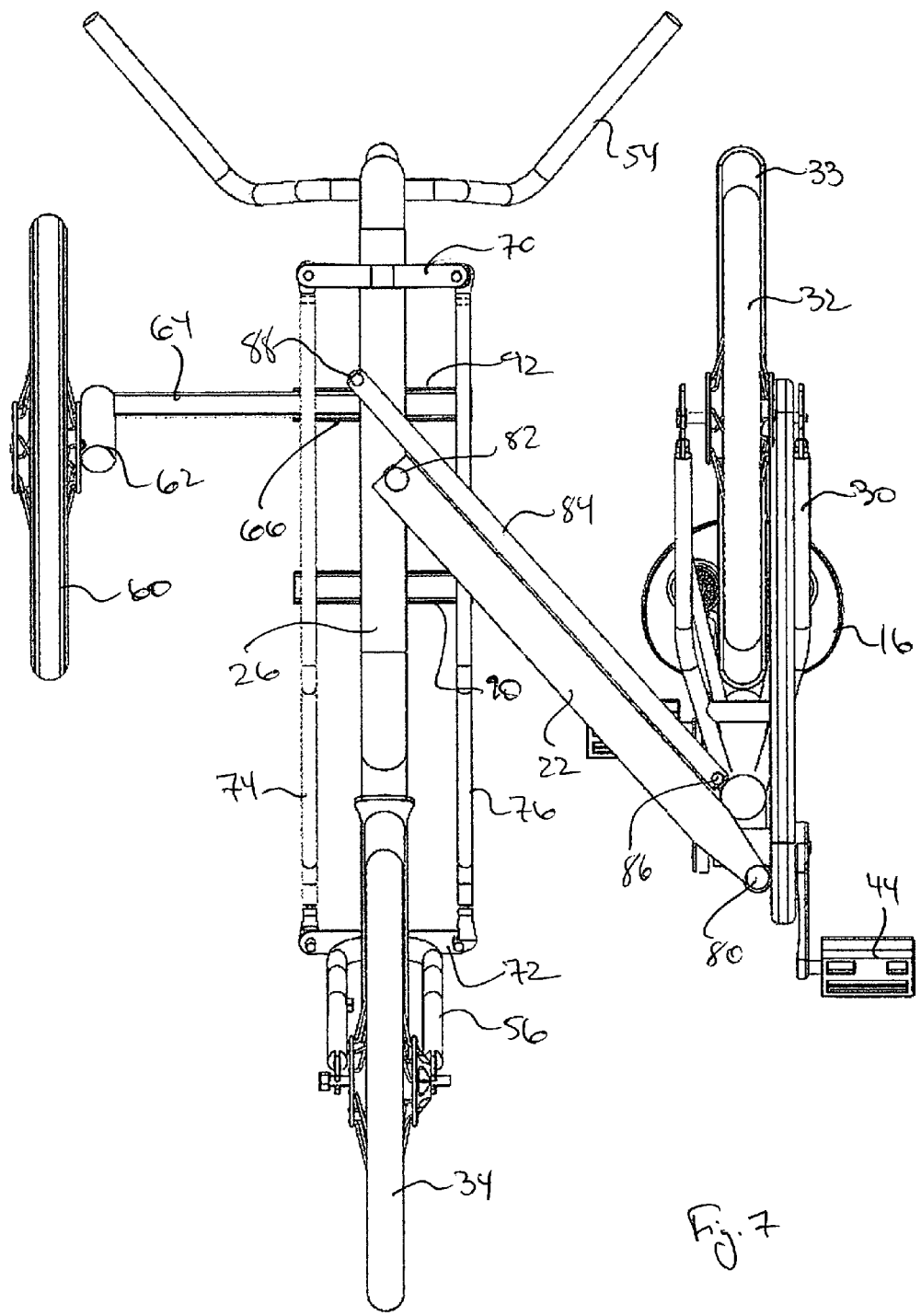
FIG. 7 is a bottom plan view of the bicycle in the stroller mode with the carrier removed for purposes of illustration.
Figure 8:
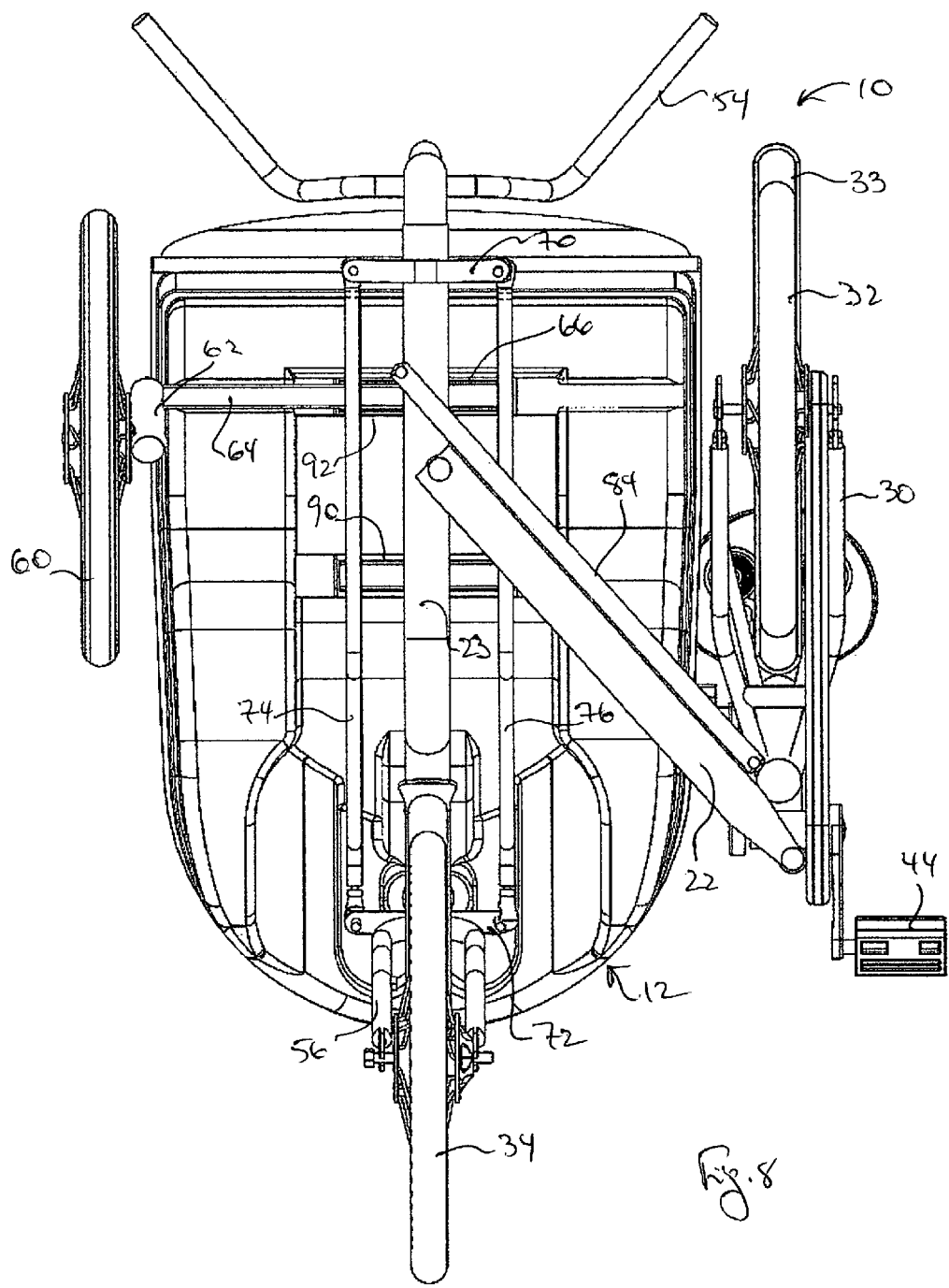
FIG. 8 is a bottom plan view of the bicycle in the stroller mode.

Accordingly, as illustrated in FIGS. 7 and 8, the rear portion 14a of the frame 14 can be folded forwardly at both the front and rear hinge points to be positioned alongside the front portion 14b of the frame 14, and particularly against one side of the carrier 12, with the rear wheel 32 oriented in the direction of travel, in order to convert the bicycle 10 to the stroller mode shown in FIGS. 8 to 12.

Figure 14:
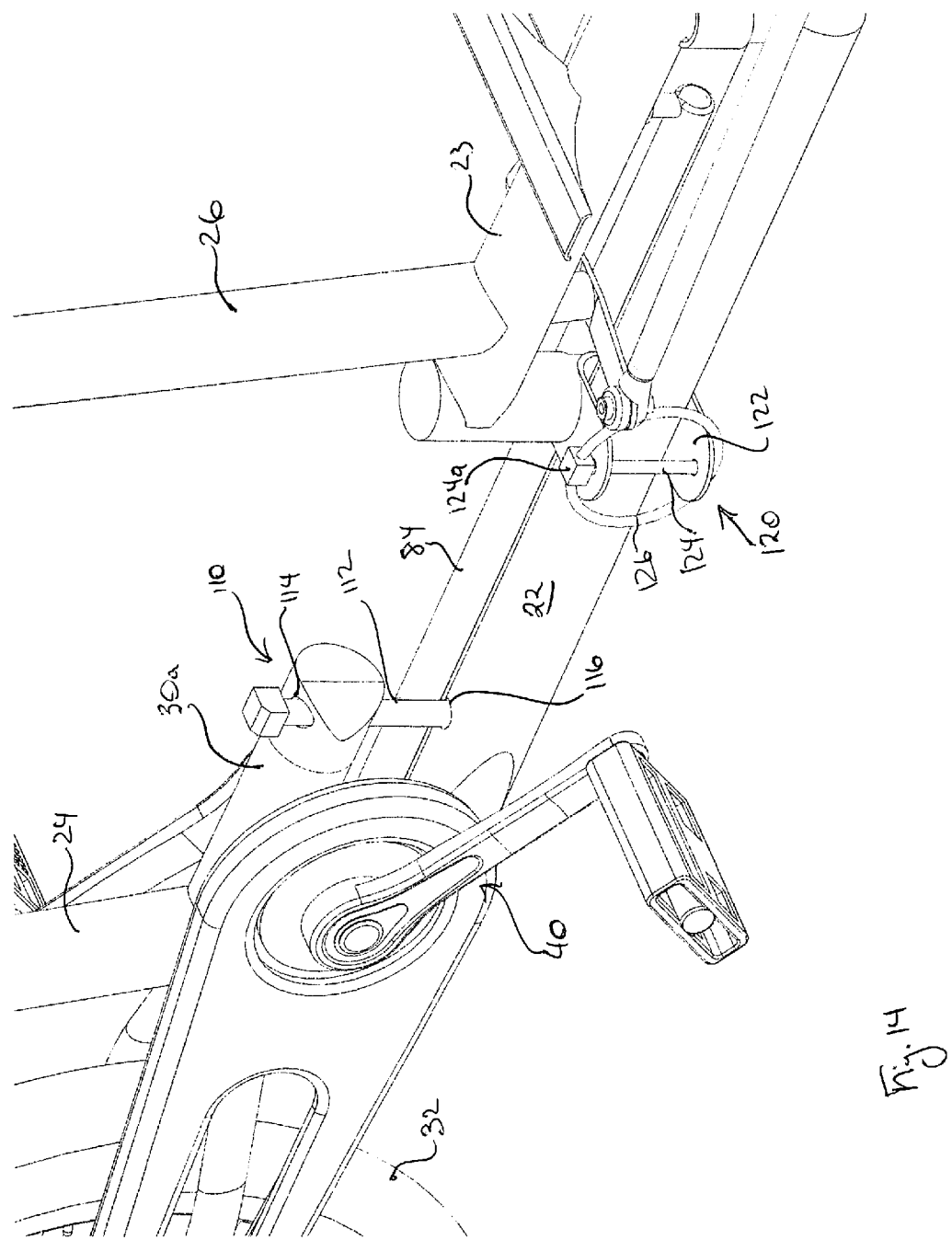
FIG. 14 is a partial perspective view of the bicycle showing the front locking mechanism in the bicycle mode.

The bicycle 10 is locked into the bicycle and stroller modes for use in each respective mode. In the embodiment shown the bicycle is locked into the bicycle mode by a bicycle mode lock, illustrated in FIG. 14. In the embodiment shown the bicycle mode lock comprises a rear lock 110 comprising a rigid pin 112 disposed through a hole 114 in a protruding portion 30a of the chain stay 30 and extending into a hole 116 disposed in a rear portion of the hinge member 22, which prevents pivoting of the rear portion 14a of the frame 14 about the pivot 80 thereby locking the rear portion 14a of the frame 14 in alignment with the hinge member 22 along the direction of travel; and a front lock 120 comprising a 'U'-shaped bracket 122 affixed to the rear portion of the bottom tube 23, in which the front portion of the hinge member 22 nests when in the bicycle mode, and a pin 124 which extends through holes 128 in the bracket 122 to trap the hinge member 22 in the clamp 122, thereby locking the front portion 14b of the frame 14 in alignment with the hinge member 22 along the direction of travel. The pin 124 may comprise a ring 126 pivotally secured to the pin 124 (for example to the head 124a) which overlaps the bottom arm of the bracket 122 to prevent the pin 124 from detaching from the bracket 122 as the mechanism is jostled in transit.

Figure 15:
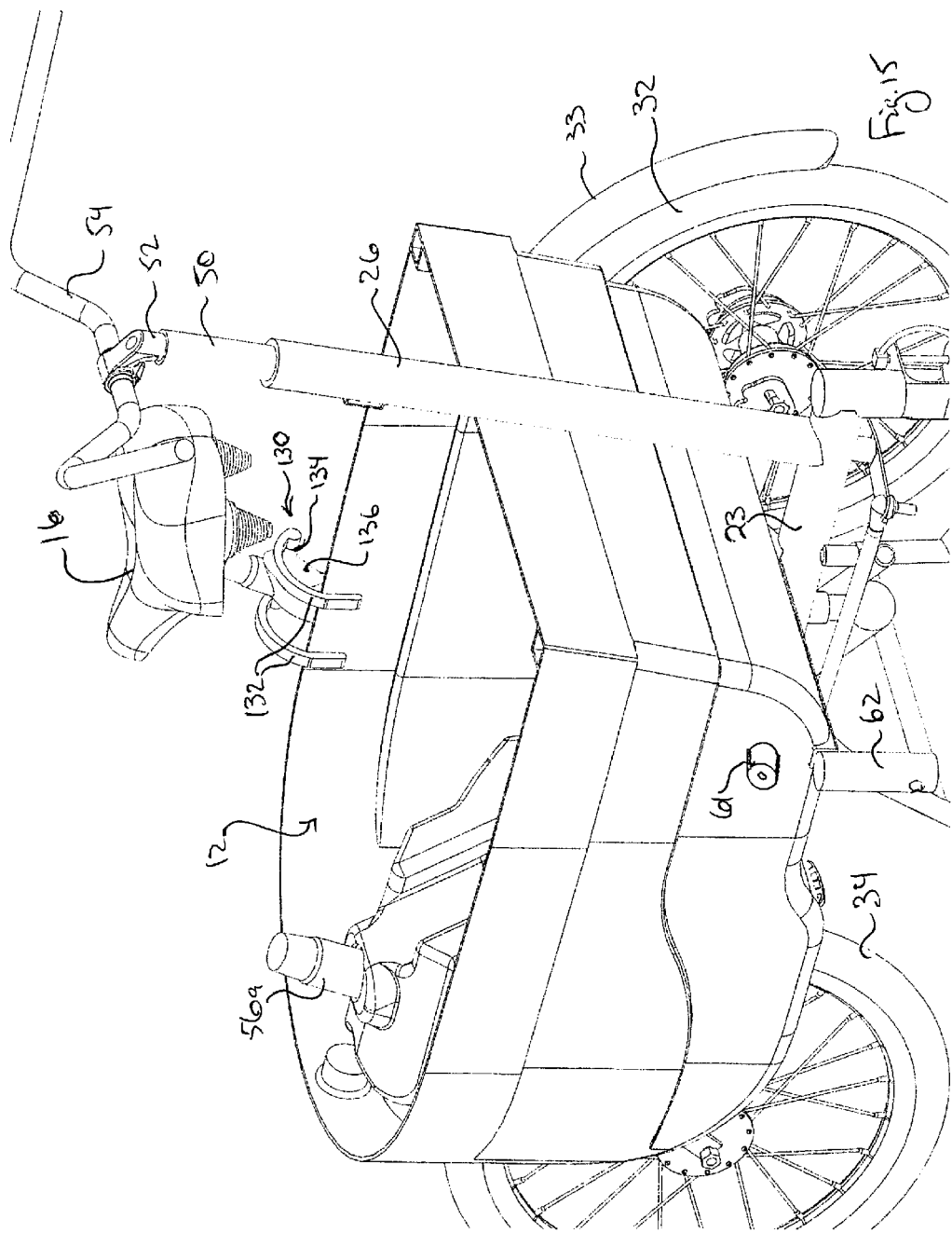
FIG. 15 is a partial perspective view of the bicycle showing the locking mechanism in the stroller mode.

To lock the bicycle 10 in the stroller mode a stroller mode lock is provided, for example as illustrated in FIG. 15 (the auxiliary wheel 60 has been omitted for purposes of illustration). The stroller mode lock 130 comprises an engaging member, in the embodiment shown a pair of arms 132 pivotally mounted as at 134 to a clamp 136 affixed to an upper portion of the seat tube 24. The arms 132 pivot to latch over the upper edge of the carrier 12, preventing the rear portion 14a of the frame 14 from moving away from the side of the carrier 12 in the stroller mode.

Figure 16:
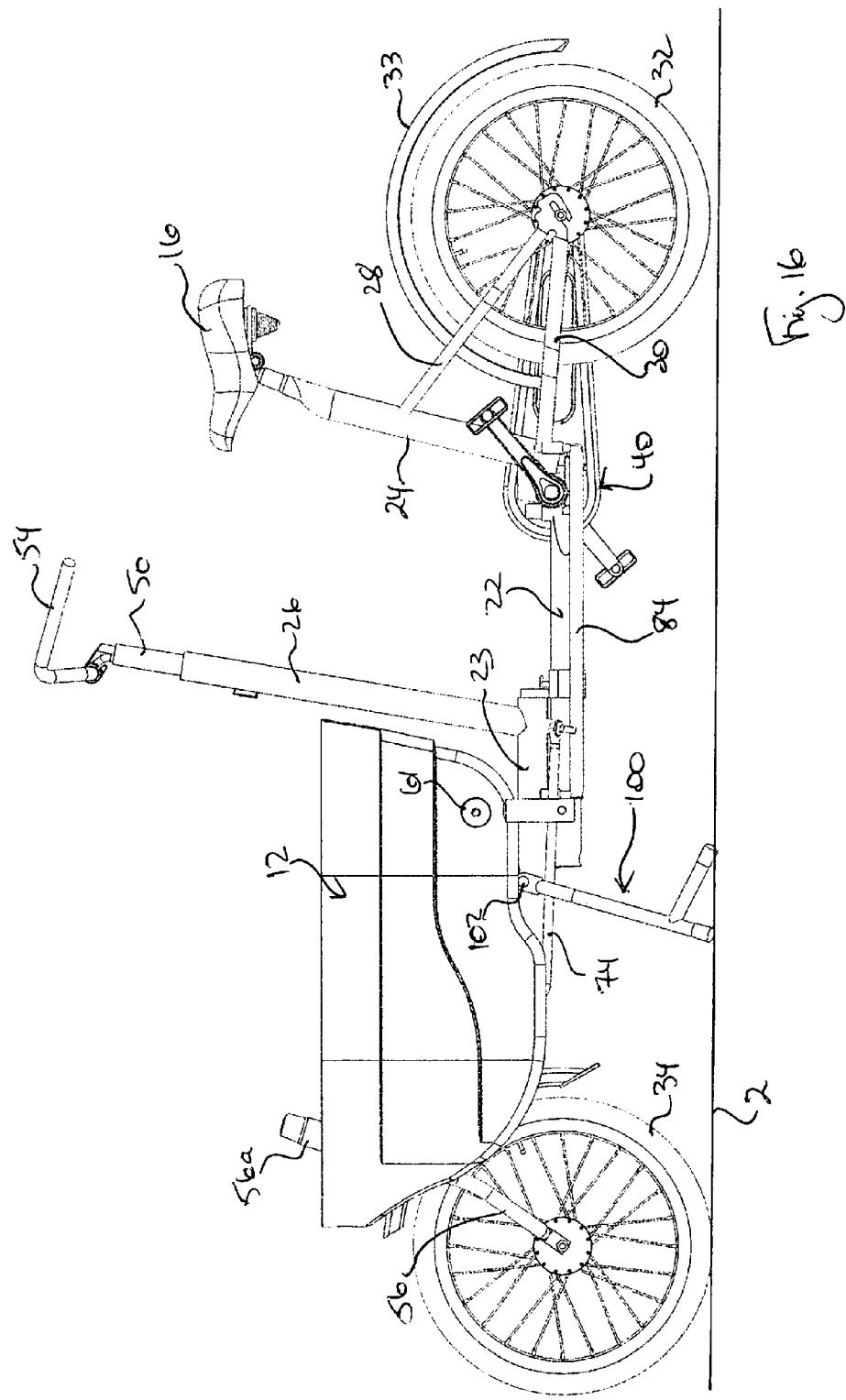
FIG. 16 is a side elevation of the bicycle in the bicycle mode showing a kickstand in the deployed position.

A kickstand 100, illustrated in FIG. 16, may be provided to assist in the conversion by supporting the rear portion 14a of the frame 14 during the conversion process. In the embodiment illustrated the kickstand 100 is pivotally fixed to the rear of the front frame portion 14b, for example to the bottom tube 23 as at 102, close to the centre of gravity of the bicycle 10 to ease the raising of the rear frame portion 14a when the kickstand 100 is deployed. The kickstand may be biased to the upper position, as is conventional.

An auxiliary wheel 60 suspended above the level of the riding surface 2 in the bicycle mode. For example the auxiliary wheel 60 may be rotationally affixed to a push-button axle 60a, which is well known to those skilled in the art, and in the embodiment shown is suspended above the riding surface (e.g. the ground) 2 by an upper receiver 61 formed in or affixed to in the wall of the carrier 12. The auxiliary wheel 60 may be stowed in any other convenient position and manner that does not interfere with the operation of the bicycle 10 in the bicycle mode. The auxiliary wheel 60 may be a conventional bicycle wheel, for example with a solid hub or hub-and-spoke construction, and may match the bicycle wheels 32, 34 in size and weight. The auxiliary wheel 60 is thus in a raised position spaced from the riding surface 2 when the bicycle 10 is in the bicycle mode, as shown in FIGS. 3 to 6, and can be moved to a lowered position in which the auxiliary wheel 60 contacts the supporting surface when the bicycle 10 is in the stroller mode, as shown in FIGS. 9 to 12, by inserting the axle 60a into a lower receiver 62. In the embodiment illustrated the lower receiver 62 depends from a shaft 64 affixed to the frame 14. The auxiliary wheel 60 is thus locked into the raised position in the bicycle mode and locked into the lower receiver 62 for use of the bicycle 10 in the stroller mode.

The carrier 12 is mounted on and supported by the front bottom tube 23, for example resting on lateral supports 90, 92 affixed to the front bottom tube 23 (lateral support 92 also serving as or housing a sleeve 66 for receiving the shaft 64 of the auxiliary wheel 60). The carrier 12 may have a bottom portion 94 formed out of any suitable material, for example plastic, in the embodiment shown formed as a unitary piece. The carrier 12 has a bottom surface with recesses 96 sized to receive the lateral supports 90, 92 in a snap-fit relation, and/or fastened to the lateral supports 90, 92 by suitable fasteners (not shown). The optional top 98 of the carrier 12, which may be removable and/or designed to be collapsed or folded toward an end of the bottom portion 94, may be made from a solid or screen fabric, or any other desired material. Because of the manner in which the bottom portion 94 is recessed to accommodate the upwardly-directed front ends of the front bottom tube 23 and tie rods 74, 76 and the front wheel 34 (see FIG. 13), a seat back for a child may be formed at the front end of the carrier 12 with the child facing rearwardly, taking advantage of a greater amount of leg room toward the rear end of the carrier 12.

The carrier 12 may be permanently attached to the frame 14 or removable. In the latter case, carriers of different configurations of carrier 12 may optionally be provided for different purposes.

In use, the bicycle 10 in the bicycle mode can be ridden in conventional fashion. The bicycle 10 is steered by turning the handlebar 54 toward the left or right, as in a conventional bicycle, so no special training or reconditioning is required to ride the bicycle 10 of the invention. Turning the handlebar 54 turns the steering column 50 within the handlebar tube 26, rotating the rear steering linkage 70, which rotation is transferred to the front steering linkage 72 via tie rods 74, 76. The drive mechanism 40 and brakes (not shown) operate in conventional fashion to propel and slow/stop the bicycle. The low centre of gravity obtained by supporting the carrier 12 on the bottom of the frame 14 improves stability relative to a carrier mounted over a wheel in a conventional bicycle.

Figure 11:
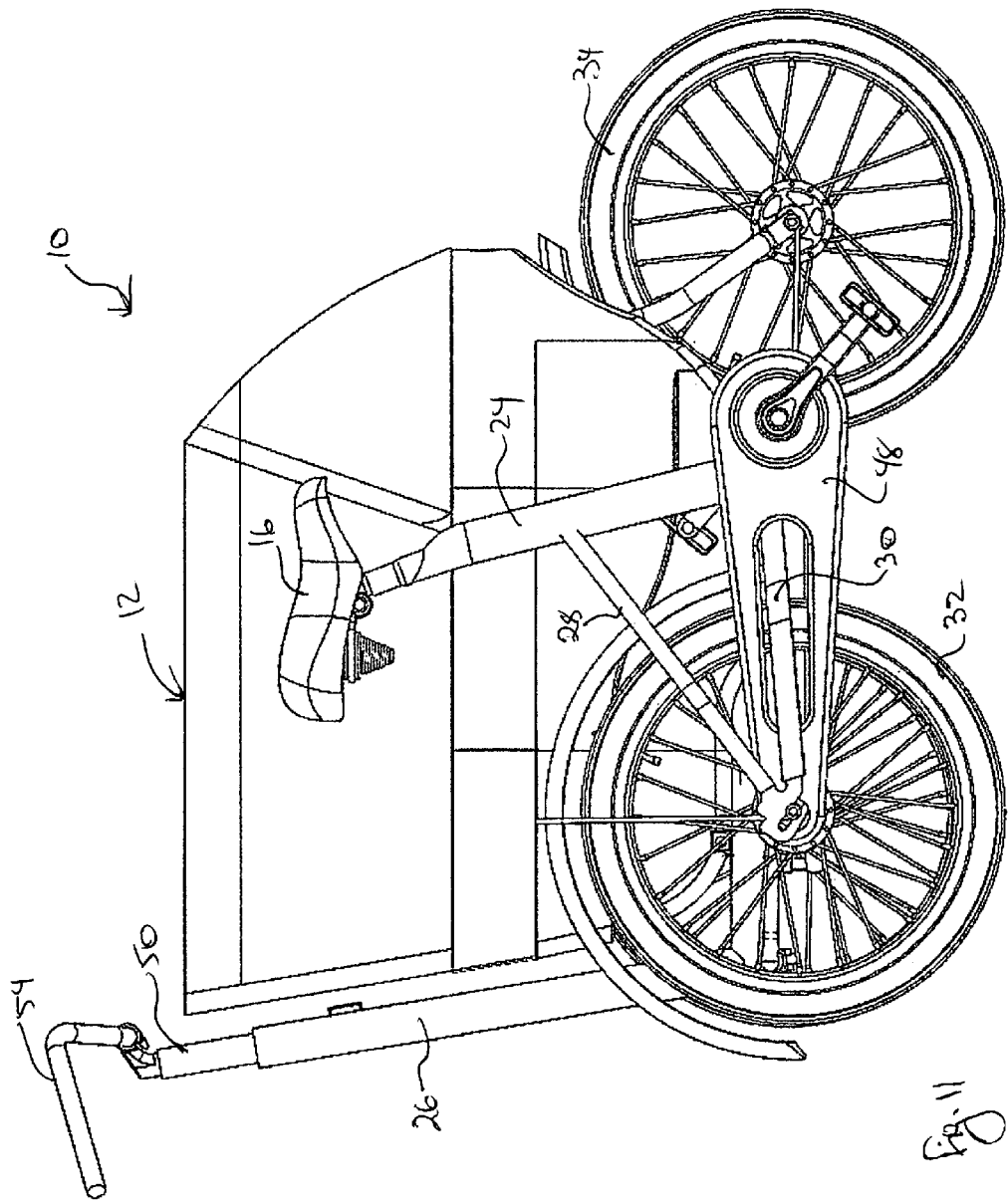
FIG. 11 is a right side elevation of the bicycle in the stroller mode.
Figure 12:
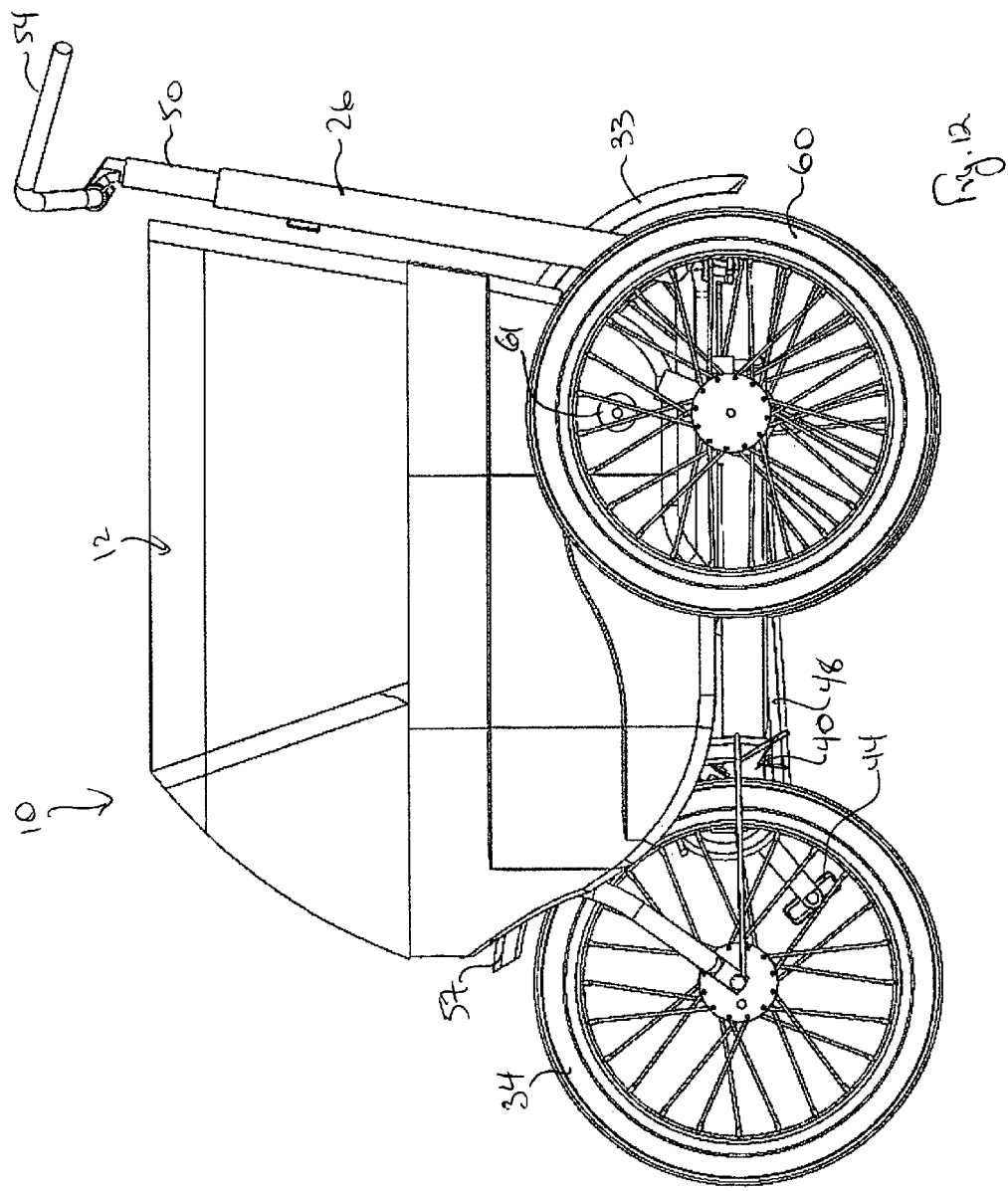
FIG. 12 is a left elevation of the bicycle in the stroller mode.

To convert the bicycle 10 to the stroller mode, the kickstand 100 is deployed to the supporting position, supporting the bicycle 10 on the three-point contact provided by the kickstand 100 and the front wheel 34. The rear and front locks 110, 120 are unlocked, releasing the rear and front portions 14a, 14b of the frame 14 relative to the bottom tube 122, and the rear portion 14a of the frame 14 (supported above the riding surface 2 by the kickstand 100, which is disposed behind the centre of gravity of the bicycle 10) is pivoted forwardly toward and alongside the front portion 14b of the frame 14 until it reaches the carrier 12, as shown in FIGS. 8 and 11. The stroller mode lock 120 is then actuated to restrain the frame 14 in this position.

The auxiliary wheel 60, in the raised position in the bicycle mode, is moved into the lowered position for the stroller mode, supporting the rear end of the carrier 12 opposite the rear wheel 32, by manually pulling the wheel 60 laterally to retract the axle 60a from the upper receiver 61 and the shaft 60a is reinserted into the lower receiver 62 to lock the auxiliary wheel 60 in the lowered position (stroller mode). The kickstand 100 is returned to the upper position and the bicycle 10, now in stroller mode, can be pushed and steered using the handlebar 54 in the manner described above. These steps are followed in reverse order to convert the bicycle 10 from the stroller mode back to the bicycle mode.

Powered assistance may be provided in both the bicycle and stroller modes, for example by an electric motor (not shown) housed in the hub of the front wheel 34 (or other convenient location) and controlled by a hand throttle (not shown). Provision may be made in the carrier 12 (or other convenient location) for batteries (not shown) to power the motor.

An embodiment of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A bicycle convertible from a bicycle mode to a stroller mode, comprising
   a frame having a front portion supporting a carrier and a rear portion supporting a seat,
   a front wheel supporting the front portion of the frame, rotationally mounted to the frame so as to be selectively pivotable to steer the bicycle,
   a rear wheel supporting the rear portion of the frame in the bicycle mode,
   a drive mechanism for propelling the bicycle in a forward direction in the bicycle mode, and
   an auxiliary wheel, movable between a raised position raised from a riding surface when the bicycle is in the bicycle mode and a lowered position contacting the riding surface to support a first side of the rear portion of the carrier when the bicycle is in the stroller mode,
   the rear portion of the frame being hinged to the front portion of the frame such that to convert the bicycle from the bicycle mode to the stroller mode the rear portion of the frame can be moved alongside the front portion of the frame to position the rear wheel to support a second side of the rear portion of the carrier opposite to the first side.

2. The bicycle of claim 1 wherein the rear portion of the frame is hinged to the front portion of the frame by a hinge member having a rear end pivotally connected to the rear portion of the frame 14 and a front end pivotally connected to the front portion of the frame, whereby the rear portion of the frame folds toward the front portion of the frame along the hinge member.

3. The bicycle of claim 2 wherein the rear portion of the frame further comprises a seat tube supporting a seat and affixed to a seat stay and a chain stay.

4. The bicycle of claim 2 wherein the rear end of the hinge member is pivotally secured to a portion of the chain stay protruding forwardly.

5. The bicycle of claim 2 wherein the front end of the hinge member is pivotally secured to a bottom tube extending along the front portion of the frame.

6. The bicycle of claim 2 comprising a link arm pivotally connected to the rear and front portions of the frame extends parallel to the hinge member, retaining the rear portion of the frame substantially in parallel alignment with the front portion of the frame as the frame is moved between the bicycle and stroller modes.

7. The bicycle of claim 5 wherein the front wheel supports a fork pivotally secured to a front end of the bottom tube and steering mechanism comprises a rotatable steering member pivoting the fork via a rear steering linkage rotationally fixed to the steering member connected by tie rods to a front steering linkage rotationally fixed to the fork.

8. The bicycle of claim 7 wherein the bottom tube and tie rods bend in an upward direction over the front wheel.

9. The bicycle of claim 7 wherein the fork is pivotally mounted to a head tube affixed to the front end of the bottom tube.

10. The bicycle of claim 5 wherein the carrier is supported on the bottom tube.

11. The bicycle of claim 10 wherein the carrier is mounted on lateral supports affixed to the bottom tube.

12. The bicycle of claim 8 wherein the carrier extends over the front wheel, a bottom of the carrier being recessed to accommodate the steering mechanism.

13. The bicycle of claim 1 wherein in the bicycle mode the auxiliary wheel comprises an axle mounted to a receiver affixed to the frame, the auxiliary wheel being movable from the raised position to the lowered position by retracting the axle from an upper receiver, repositioning the wheel and reinserting the axle into a lower receiver.

14. The bicycle of claim 13 wherein the upper receiver is disposed on a wall of the carrier.

15. The bicycle of claim 13 wherein the lower receiver depends from a shaft affixed to the frame.

16. The bicycle of claim 5 wherein the frame is locked in the bicycle mode by a pin rotationally locking the rear portion of the frame to the hinge member and a bracket affixed to a rear end of the bottom tube.

17. The bicycle of claim 1 wherein the frame is locked in the bicycle mode by an engaging member adapted to engage the carrier.

18. The bicycle of claim 1 wherein the engaging member comprises at least one arm pivotable to a position engaging over a wall of the carrier.

19. The bicycle of claim 1 comprising a kick stand movable between a rest position raised from the riding surface and a supporting position contacting the riding surface to support a portion of the frame above the riding surface.

20. The bicycle of claim 18 wherein the kick stand is disposed along a portion of the frame behind a centre of gravity of the bicycle, to thereby support the rear portion of the frame raised above the riding surface.

* * * * *